United States Patent [19]

Hoffman et al.

[11] 4,246,436

[45] Jan. 20, 1981

[54] JUNCTION ENCLOSURE ASSEMBLY

[75] Inventors: Harry W. Hoffman; Kerwin A. Posthuma, both of Anoka, Minn.

[73] Assignee: Federal Cartridge Corporation, Minneapolis, Minn.

[21] Appl. No.: 943,922

[22] Filed: Sep. 20, 1978

[51] Int. Cl.³ .............................................. H05K 5/04
[52] U.S. Cl. .................................... 174/52 R; 174/50; 248/215; 361/359; 361/427
[58] Field of Search ................... 174/52 R, 50, 48, 38; 361/427, 358, 359, 334; 248/215

[56] References Cited

U.S. PATENT DOCUMENTS

| 888,032 | 5/1908 | Peterson | 248/215 |
|---|---|---|---|
| 1,919,457 | 7/1933 | Bay | |
| 2,232,962 | 2/1941 | Papp et al. | |
| 2,291,966 | 8/1942 | Joseph | 248/215 |
| 3,388,299 | 6/1968 | Brideweser et al. | 361/334 |
| 3,691,288 | 9/1972 | Sturdivan | 174/38 |
| 3,784,727 | 1/1974 | Haubein | 174/52 R |
| 3,841,032 | 10/1974 | Grannis | 174/50 X |
| 3,868,040 | 2/1975 | Langmack, Jr. et al. | 174/50 X |

FOREIGN PATENT DOCUMENTS 2414754 10/1974 Fed. Rep. of Germany ............ 174/48

Primary Examiner—B. A. Reynolds
Assistant Examiner—D. A. Tone
Attorney, Agent, or Firm—Schroeder, Siegfried, Ryan, Vidas, Steffey & Arrett

[57] ABSTRACT

A junction enclosure assembly including an enclosure having a pair of vertically spaced rails mounted upon the inner surface of the back panel thereof in forwardly spaced relation and a junction mounting panel having a mounting bracket at each of its upper and lower end portions which extend rearwardly and downwardly behind the rails and are inserted behind the rails from above to attach and support the mounting panel upon the rails in a readily, quickly and easily removable manner is disclosed. Threaded interengagement means is carried by the mounting panel for locking same to the rails.

8 Claims, 3 Drawing Figures

U.S. Patent
Jan. 20, 1981
4,246,436
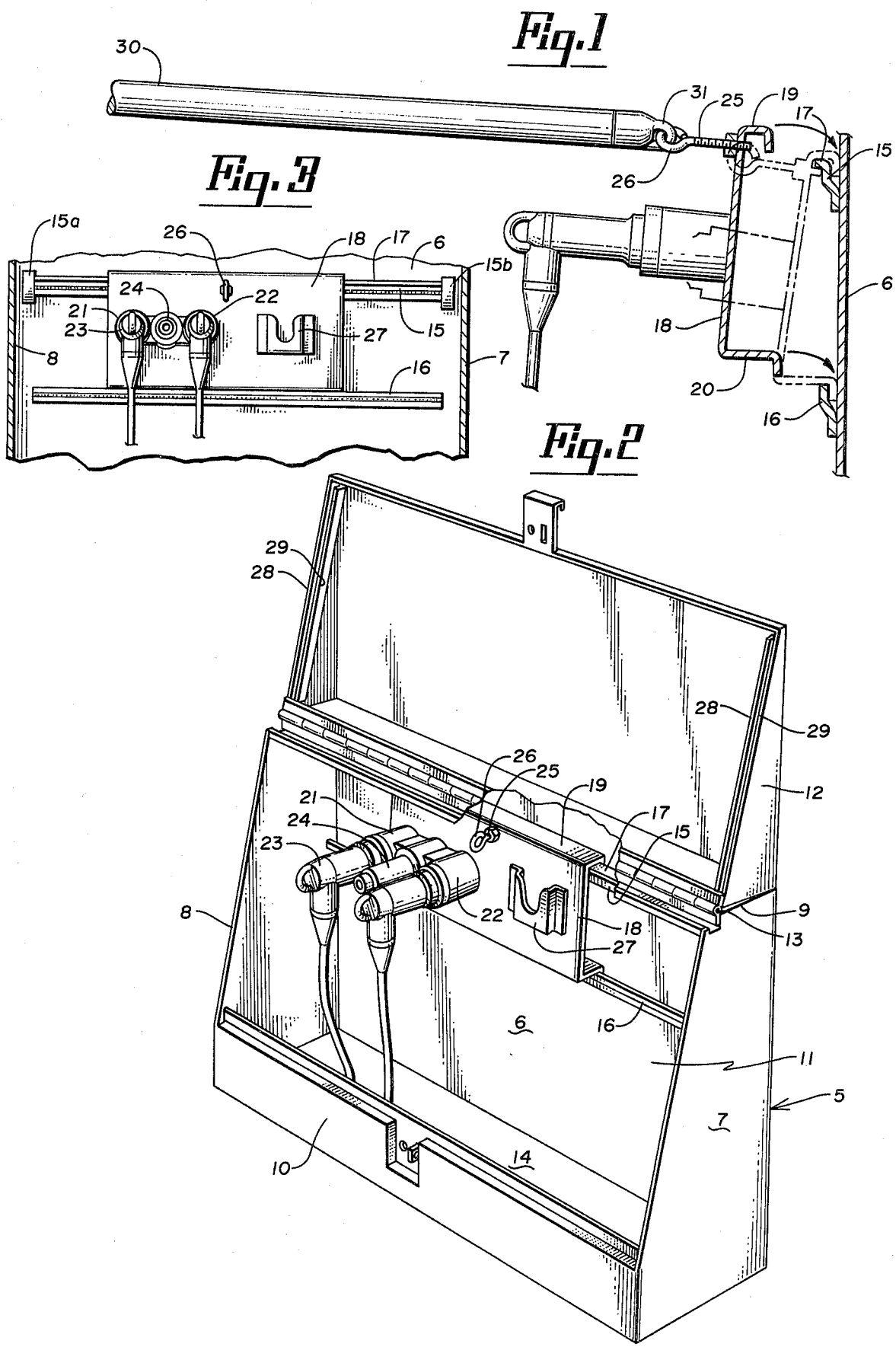

JUNCTION ENCLOSURE ASSEMBLY

In the maintenance and servicing of junction mounting panels, it is frequently necessary to remove a junction mounting panel and substitute another therefor. Such a need arises, for example, when lightning may destroy a module, whereupon it becomes necessary to remove the mounting panel from the junction enclosure and substitute another therfor. Thereafter, the primary cable carried by the original junction mounting panel is disconnected, and then connected to the mounting panel which has been attached as a replacement. It is conventional during such servicing operations to connect the primary cable to a feed-through accessory or by-pass which is comprised of a two-position module from which no power is taken. Such a two-position module is conventionally mounted upon what is termed a parking stand carried by a separate mounting panel on a separate support. The conventional method of securing mounting panels to the rear wall of an enclosure is to bolt the panel to the back wall. To do so requires that the mounting panel be supported manually while six or more bolts and nuts are applied to mount the panel upon the rear wall. Since such mounting panels weigh about 25-30 lbs., such procedures involve considerable work and are tiring. Even more importantly, it normally requires 25-55 minutes to effect such a transfer for the panel must be supported manually while such bolts are inserted and secured.

As a result of the invention herein, it is possible to very quickly transfer the primary cable to such a stand-off insulator and then quickly and easily remove the damaged mounting panel from the enclosure and substitute a new and properly functioning panel therefor with a minimum of energy and a greatly reduced amount of time being required.

It is a general object of our invention to provide a novel and improved junction enclosure assembly which will greatly reduce the amount of time and effort required for servicing and maintaining the junction modules carried by the junction mounting panel.

A more specific object is to provide a junction enclosure assembly which will enable a service man to greatly reduce the amount of time and effort required for attaching or detaching a module mounting panel to the inner rear wall of an enclosure, thereby effecting a substantial saving in time and effort while increasing the safety with which the operation may be accomplished.

A still more specific object is to provide a novel and improved junction enclosure assembly which will permit a serviceman to handle a mounting panel at all times during its attachment or detachment through the use of a "hot-stick" and thereby increase the safety while simultaneously reducing the time required for the operation by approximately 25-55 minutes and saving substantial energy through the elimination of work.

These and other objects and advantages of our invention will more fully appear from the following description, made in connection with the accompanying drawings, wherein like reference characters refer to the same or similar parts throughout the several views, in which:

FIG. 1 is a fragmentary side elevational view showing the mounting rails and mounting panel of the novel junction enclosure in vertical section, the novel mounting panel being shown in solid lines being presented to the rails preparatory to engagement, and shown in attached position in broken lines; and FIG. 2 is a perspective view of our junction enclosure assembly with portions thereof broken away to more clearly show its construction.

FIG. 3 is a fragmentary front elevational view of the mounting panel and supporting mounting rails.

FIGS. 1-3 show the preferred embodiment of our invention. As shown, it includes a junction enclosure indicated generally by the numeral 5 and which is comprised of a rear wall panel 6, side wall panels 7 and 8, a top wall 9, and a front wall 10. The latter has an opening 11 therein of substantial size and a cover member 12 is hingedly mounted as at 13 upon the top wall 9. This cover member 12, when in closed position, closes the opening 11 and when opened, provides ready and ample access to the interior of the enclosure to enable the serviceman to work upon the mounting panel as hereinafter described. The entire enclosure rests, as is conventional, on a ground shield 14, which may be constructed of concrete, steel or Fiberglass.

Mounted upon the rear wall 6 of the enclosure 5 is a pair of vertically spaced, horizontally extending rails 15 and 16 which extend generally parallel to each other and to the rear panel, in forwardly spaced relation to said panel. Each of these rails is fixedly secured to the back panel 6 in a suitable manner such as by welding. The load supporting portions of each are forwardly spaced from the rear panel and each of them define a channel therebehind which faces upwardly, thereby permitting a mounting panel as hereinafter described to be secured thereto by lowering the panel from above into the channels between the respective rails and the rear panel 6. This can best be seen in FIGS. 1 and 2. A forwardly extending locking flange 17 is carried by the upper rail 15 for a purpose to be hereinafter described. Abutments 15a and 15b are provided at the ends of rail 15 to insure the necessary ground plane spacing for the mounting panel to be carried thereby.

A mounting panel 18 is constructed and arranged to cooperate with the rails 15 and 16 to enable the junction mounting panel to be quickly and easily fixedly secured thereto or detached therefrom. As shown, the mounting panel 18 has upper and lower end portions each of which is provided with a mounting bracket 19, 20 each of which extends first rearwardly and then downwardly. The rearwardly extending portion of the lower bracket 20 is substantially greater in horizontal dimensions than is the corresponding portion of the upper bracket 19 so when the mounting panel is applied to the mounting rails and mounted thereupon, the face of the panel extends downwardly and forwardly from the upper mounting bracket 19. This can best be seen in FIG. 1. The mounting panel 18 is provided with a plurality of openings, the number of which is predetermined by the number of outlets or modules which are to be applied thereto and supported thereby. As shown in FIGS. 1-3, the mounting panel 18 is provided with three such openings to accommodate what are termed three-position, flat wall junction modules, two of the positions being provided for the primary cable and the third being provided as an outlet for the power which is to be taken off the main line. As shown in FIG. 2, positions or modules 21 and 22 accommodate the primary cable 23 and the central position or module 24 is designed to accommodate the cable through which the power is to be taken from the primary circuit.

The upper end portion of the bracket 18 is provided with threaded engagement means 25 which has an eyelet 26 at its outer end and extends through the panel 18 in threaded relation in position to engage the upper mounting bracket 15 immediately below the locking flange 17 to positively secure the panel 18 to the rails 15, and 16 in a very simple and efficient manner with a minimum of time.

A socket member 27 is also carried by the mounting panel 18 to accommodate a two-position or two-outlet module which functions as a feed through accessory or standoff insulator. When such a module is placed in the parking stand 27, the mounting panel may be utilized as a temporary, safe location for the primary cable of another panel which may need repair or replacement.

The forward edges of the cover member 12 are provided with a pair of parallel flanges 28 and 29 which are slightly spaced a distance only sufficient to receive the leading edges of the side panel 7 and 8 therebetween in a sandwich-like relation. When so received, it is impossible for foreign objects such as a coat hanger, to be inserted into the interior of the junction enclosure. The sandwich-like effect of the edges 28 and 29 precludes the successful insertion of such a piece of wire into the interior of the enclosure.

In the handling of junction mounting panels, it has become conventional in the industry to utilize what is termed a "hot-stick" 30 in order to safely handle such panels. As will be seen by reference to FIG. 1, the primary cables are provided with loops adapted to accommodate a releasable hook 31 of the "hot-stick" 30 by means of which the primary cables can be applied to or withdrawn from the outlet modules 21 and 22. It may also be utilized to engage the eye 26, as shown in FIG. 1, to release or tighten the securing means 25 as will be hereinafter described.

The manner of application and usage of our improved junction enclosure assembly is demonstrated in FIG. 1. Assuming that the junction modules have been damaged, such as by lightning, the serviceman utilizes the "hot-stick" 30 to engage the eye 26 and turn it outwardly so as to release the locking flange 17. As soon as the locking flange 17 has been cleared by the inner end of the threaded element 25, it is possible for the serviceman to lift the entire panel upwardly and free of the rails 15 and 16 and to transfer the panel 18 to a separate and remotely locating mounting panel support. If desired, in lieu thereof, the "hot-stick" may be utilized to engage the eyelets of the primary cable and withdraw them from the modules 21 and 22 and insert them into a feedthrough accessory carried by a parking stand such as 27 on another panel on a separate support, thereby temporarily parking the primary cable at a safe location while the operator removes the panel 18 from the rails 15 and 16 in the manner just described. It will be readily appreciated that the mounting panel 18 can be quickly attached or detached relative to the rails 15 and 16 in this manner, the entire replacement operation requiring only approximately 1-2 minutes, thereby obviating the need for supporting the heavy mounting panel for an extended period as hereinabove described. When the mounting panel 18 has been replaced with a new or similar panel, it is a simple matter through the use of a "hot-stick" to replace the primary cable 23 and the entire system will then be ready for renewed operation. In this manner, the period of outage which is required is very substantially reduced and a substantial savings in time and effort is accomplished.

It will, of course, be understood that various changes may be made in the form, details, arrangement and proportions of the parts shown and described herein without departing from the scope of our invention which consists of the matter set forth in the appended claims.

We claim:

1. A junction enclosure assembly comprising
   (a) a housing member having a back panel with an inner surface, opposed side walls, a top wall, and a front wall having an opening therein of substantial size;
   (b) a hinged cover member hingedly mounted on said top wall and, when in closed position, closing said opening;
   (c) a pair of parallel vertically spaced horizontally extending rails mounted on the inner surface of said back panel and extending generally parallel thereto in forwardly spaced relation thereto;
   (d) a junction mounting panel mounted on said rails and supported thereby, said junction mounting panel including rearwardly and downwardly extending vertically spaced rail-engaging members constructed and arranged to be inserted from above downwardly behind said rails into panel supporting relation and to thereby cooperatively engage the same to removably secure said mounting panel to said back panel within said housing member;
   (e) said junction mounting panel including hot-stick inter-engaging means by which said panel may be safely detached, lifted and moved with a hot-stick while remaining connected to high voltage feed wires; and
   (f) said rails and said rail-engaging members having inter-engaging surfaces, each of which is flat and smooth to facilitate quick and simple inter-engagement and detachment relative to each other.

2. The structure defined in claim 1, and
   (e) said mounting panel having rearwardly extending upper and lower end portions constituting mounting flanges constructed and arranged to cooperatively engage said rails in panel supporting relation.

3. The structure defined in claim 1, and
   (e) said mounting panel having an upper end portion which extends first rearwardly and then downwardly to constitute a mounting flange and which is constructed and arranged to have its downwardly extending portion inserted from above behind the uppermost of said rails to cooperatively and readily removably support said mounting panel upon said rail.

4. The structure defined in claim 1, and
   (e) said mounting panel having upper and lower end portions, each of which extends first generally horizontally and rearwardly and then downwardly to constitute a mounting flange which is constructed and arranged to have its downwardly extending portion inserted behind one of said rails from above to cooperatively and readily removably support said mounting panel upon said rails;
   (f) the horizontal dimensions of the rearwardly extension of said lower end portion being substantially greater than that of said upper end portion.

5. The structure defined in claim 1, and
   (e) said mounting panel having an upper end portion which extends first rearwardly and then downwardly, constituting a mounting flange which is constructed and arranged to have its downwardly extending portion inserted from above behind the uppermost of said rails to cooperatively and readily removably support said mounting panel upon said rail; and (f) threaded securing means carried by said mounting panel adjacent said upper end portion in pierced relation and constructed and arranged to engage the uppermost of said rails and thereby readily removably secure said mounting panel to said rails.

6. The structure defined in claim 1, and (e) a locking flange carried by the upper one of said rails and extending forwardly therefrom; and (f) threaded securing means carried by said mounting panel adjacent said upper end portion and extending rearwardly therefrom in piercing interthreaded relation, and constructed and arranged to extend below said locking flange when in locking position to thereby cooperatively and readily releasably lock said mounting panel to said rails.

7. The structure defined in claim 1, and (e) said mounting panel extending downwardly and forwardly relative to the uppermost of said rail-engaging members.

8. A junction enclosure assembly comprising (a) a housing member having a back panel with an inner surface, opposed side walls, a top wall, and a front wall having an opening therein of substantial size;

(b) a hinged cover member hingedly mounted on said top wall and, when in closed position, closing said opening;

(c) quick-release mounting panel-engaging means mounted upon the inner surface of said back panel and extending forwardly therefrom, said means being constructed and arranged to permit quick and simple inter-engagement with and detachment from a junction mounting panel;

(d) a junction mounting panel mounted on said means and supported thereby upon the inner surface of said back panel, said junction mounting panel being constructed and arranged to quickly and easily cooperatively inter-engage said means when lowered from above into supported position relative thereto; and (e) said junction mounting panel including hot-stick inter-engaging means by which said panel may be safely lifted and moved with a hot-stick while remaining connected to high voltage feed wires.

* * * * *